US012762020B1

(12) United States Patent
Liu et al.

(10) Patent No.: US 12,762,020 B1
(45) Date of Patent: Oct. 13, 2026

(54) UNIVERSAL FORMAT FOR MULTIPLE STORAGE LAYER COMPATIBILITY

(71) Applicant: Databricks, Inc., San Francisco, CA (US)

(72) Inventors: Zhaolei Liu, Mountain View, CA (US); Frederick Ryan Johnson, Orem, UT (US); Terry Kim, Bellevue, WA (US); Hao Jiang, Sunnyvale, CA (US); Mitchell Scott Sandre, San Francisco, CA (US); Lukas Lanzelot Rupprecht, Mountain View, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 19/185,127

(22) Filed: Apr. 21, 2025

Related U.S. Application Data

(60) Provisional application No. 63/639,440, filed on Apr. 26, 2024.

(51) Int. Cl.
*G06F 16/27* (2019.01)
*G06F 11/1446* (2026.01)

(52) U.S. Cl.
CPC .......... *G06F 11/1448* (2013.01); *G06F 16/27* (2019.01)

(58) Field of Classification Search
CPC ............................. G06F 16/214; G06F 16/254
USPC ........................................................ 707/649
See application file for complete search history.

(56) References Cited

U.S. PATENT DOCUMENTS

| | | | | |
|---|---|---|---|---|
| 2007/0156984 | A1* | 7/2007 | Ebata | G06F 3/0608 714/E11.13 |
| 2011/0167045 | A1* | 7/2011 | Okamoto | G06F 16/1824 707/661 |
| 2015/0120645 | A1* | 4/2015 | Varakur | G06F 16/2379 707/607 |
| 2024/0303248 | A1* | 9/2024 | Fox | G06F 16/283 |
| 2025/0131070 | A1* | 4/2025 | Sun | G06F 21/31 |

* cited by examiner

*Primary Examiner* — Baoquoc N To
(74) *Attorney, Agent, or Firm* — Fenwick & West LLP

(57) ABSTRACT

One of the key challenges that entities face when adopting data lakehouse for data storage is selecting a storage format for their data. However, choosing a single storage format to standardize is a difficult task, and entities often end up using different storage formats and different data processing services that may provide support for a particular storage format but not for the other. The disclosure addresses these challenges by recognizing the fact that different data storage formats are built on data files of the same type. The main differences are the metadata layer that stores metadata files describing the properties of these data files. The metadata for a second data storage format is automatically generated against a single copy of data files. As a result, entities can use the most suitable tool for each data workload and operate on a single data source, with interoperability across different storage ecosystems.

18 Claims, 7 Drawing Sheets

UNIVERSAL FORMAT FOR MULTIPLE STORAGE LAYER COMPATIBILITY

CROSS-REFERENCE TO RELATED APPLICATIONS

This application claims the benefit of U.S. Provisional Patent Application No. 63/639,440, filed on Apr. 26, 2024, which is incorporated by reference herein in its entirety.

TECHNICAL FIELD

This disclosure relates generally to data storage technologies, and more particularly to converting and storing metadata files for different data storage formats for data storage systems.

BACKGROUND

A data processing service often manages a significant amount of data for one or more entities in various forms, such as structured or unstructured data in the form of, for example, data tables. A data table may include a set of records or instances, where each record includes values for one or more features. The data processing service may manage data tables with many records as one or more data files, in which a data file includes a respective subset of records of a data table. Thus, the data processing service may manage large file repositories. Moreover, the data processing service may receive requests from users to perform one or more transaction operations on a data table that include, for example, read or write operations. For example, a user (e.g., data analyst) associated with an entity may request that the data processing service modify a data table to include a new set of records for the entity.

Typically, data in a data lake is stored in a data format that provides one or more features for transaction management, improved storage and retrieval, and the like. Often times, users store data in different data formats but may use client applications of a data processing service that is able to read and write data using a data format specific to that data processing service. In such an instance, users of the data processing service may have difficulty reading the data stored in a different format and may not be able to utilize various services of the data processing service. One way to address this technical problem is to store a redundant copy of the data, which corresponds to the data table under the required format, so that the data processing service is able to retrieve and write to that data table. However, this results in redundant and wasteful storage and computational resources, especially for large-scale data tables.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

The figures depict various embodiments of the present configuration for purposes of illustration only. One skilled in the art will readily recognize from the following discussion that alternative embodiments of the structures and methods illustrated herein may be employed without departing from the principles of the configuration described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One of the key challenges that entities face when adopting data lakehouse for data storage is selecting a storage format for the entities' data. However, choosing a single storage format to standardize is a difficult task, and entities often end up using different storage formats and different data processing services that may provide support for a particular storage format but not for the other. The disclosure addresses these challenges by recognizing the fact that different data storage formats are built on data files of the same type (e.g., parquet). The main differences are the metadata layer that stores metadata files describing the properties of these data files. The disclosure solves interoperability needs by providing a live view of the data for clients, regardless of storage format. The metadata for a second data storage format is automatically generated against a single copy of data files. As a result, entities can use the most suitable tool for each data workload and operate on a single data source, with interoperability across different storage ecosystems.

Figure 1:
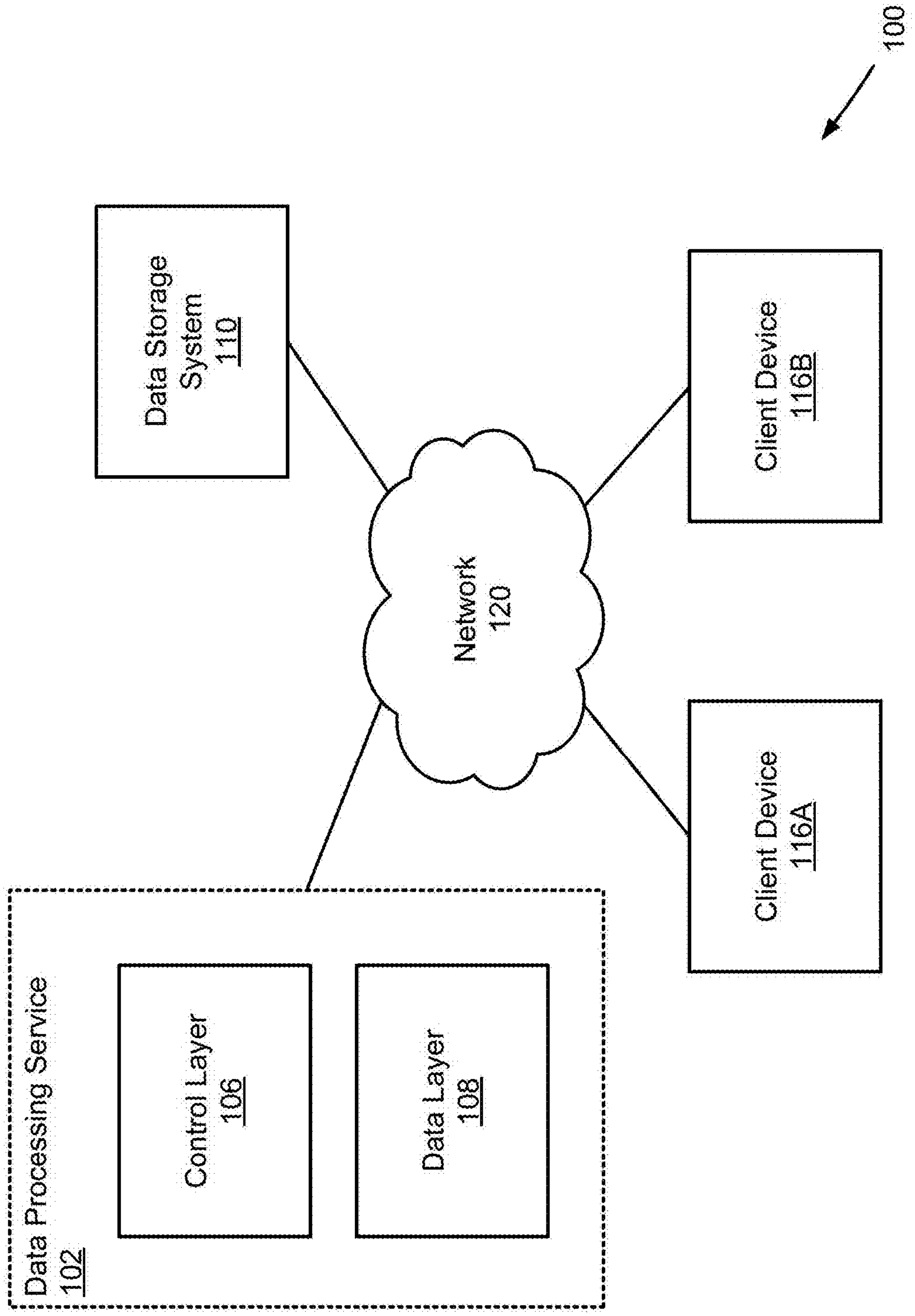
FIG. 1 is a high-level block diagram of a system environment for a data processing service, in accordance with an embodiment.

FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100. The computing systems of the system environment 100 may include some or all of the components (systems (or subsystems)) of a computer system 800 as described with FIG. 8.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

In one embodiment, the data processing service 102 provides a method and system to provide a universal storage format for a data storage system 110 (e.g., Delta Lake) that enables computing resources (e.g., engines or tools) that support one or more data storage formats to read data from the data storage system 110 without being locked to a specific format used by a data processing system or platform. A data lake is a repository for storing often times large amounts of data (structured or unstructured) in some format. It is designed to handle diverse data types and formats, making it suitable for data analytics, machine-learning, artificial intelligence (AI), and other data-intensive applications. In one embodiment, the computing resources of the data processing service 102 that access data in the data lake includes a transactional layer (e.g., group of software functionalities) that performs various functionalities, including retrieving the data relevant to the request, perform transaction management to update changes to a data table that comply with atomicity, consistency, isolation, and durability (ACID) transaction properties, and the like. The transactional layer may be configured within a compute resource of the control layer 106 or the data layer 108.

Moreover, since data in the data storage system 110 (e.g., cloud object data store) stores unstructured data in addition to structured data, it may be difficult to track the data in a data lake compared to data stored in, for example, a structured database. Therefore, the transaction layer also generates and maintains one or more metadata files in association with the data files of a data table that allow the transaction layer to navigate the data storage system 110 to retrieve and write data desired by users in a structured and computationally efficient manner. Therefore, the data files or metadata files of a data table may be stored according to different storage formats (e.g., schema, organization of files, metadata), and a compute resource is able to interact with the data if configured with the transactional layer for that format that includes, for example, libraries for reading or writing data in that format, and the like.

In one embodiment, a data table is stored as a set of parquet files and one or more metadata files describing the parquet files that are formatted using the Delta Lake protocol. In one embodiment, the data processing service 102 configures a universal format write protocol, such that a client supporting data tables formatted in a different storage format (e.g., Apache Iceberg™) can also read and retrieve data from the data storage system 110 stored in the different format. A data table in Apache Iceberg™ format may be stored as a set of parquet files and one or more metadata files. However, embodiments are not limited hereto, and it is appreciated that the data processing service 102 can enable reading and retrieval of data for clients supporting at least a first data format or a second data format as well as multiple formats including a third format and a fourth format.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system is described in relation to FIG. 4. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 includes multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. This way, when the data processing request can be divided into jobs that can be executed in parallel, the data processing request can be processed and handled more efficiently with shorter response and processing time.

The data storage system 110 includes a device (e.g., a disc drive, a hard drive, or a semiconductor memory) used for storing database data (e.g., a stored data set, portion of a stored data set, or data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data management system 110 may be managed by the same entity that manages the data processing service 102.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, client devices 116 of the system environment 100 may include some or all of the components (systems (or subsystems)) of a computer system 800 as described with FIG. 8.

In one embodiment, a client device 116 executes one or more applications allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the various systems of the system environment 100 through an application programming interface (API) running on a native operating system of the client device 116, such as IOS® or ANDROID™.

Figure 2:
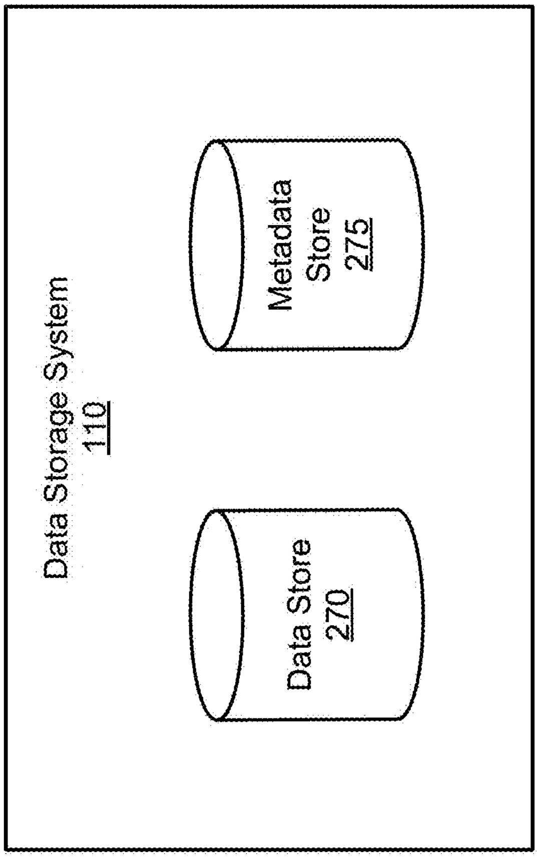
FIG. 2 illustrates a block diagram of an architecture of a data storage system, in accordance with an embodiment.

FIG. 2 is a block diagram of an architecture of a data storage system 108, in accordance with an embodiment. In one embodiment, the data storage system 108 includes a data ingestion module 250. The data storage system 108 also includes a data table store 270 and a metadata store 275.

The data store 270 stores data associated with different tenants of the data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file. In one implementation, the data files are parquet files.

In one embodiment, a data table is stored in the data store 270 in conjunction with metadata stored in the metadata store 275. In one instance, the metadata includes transaction logs (e.g., Delta Logs) for data tables. Specifically, a transaction log for a respective data table is a log recording a sequence of transactions performed on the data table. A transaction may perform one or more changes to the data table that may include removal, modification, and additions of records and features to the data table, and the like. As an example, a transaction may be initiated responsive to a request from a user of the client device 116. As another example, a transaction may be initiated according to policies of the data processing service 102. Therefore, a transaction may write one or more changes to data tables stored in the data storage system 110.

In one embodiment, a new version of the data table is committed when changes of a respective transaction are successfully applied to the data table of the data storage system 108. Since a transaction may remove, modify, or add data files to the data table, a particular version of the data table in the transaction log may be defined with respect to the set of data files for the data table. For example, a first transaction may have created a first version of a data table defined by data files File A and File B, each having information for a respective subset of records. A second transaction may have then created a second version of the data table defined by data files File A, File B and in addition, a new data file File C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity, and may indicate the specific changes to individual records with an indication of whether the record was inserted, deleted, or updated due to the corresponding transaction.

In one embodiment, the transaction log for a data table in the metadata store 275 includes one or more log files (e.g., JSON files) that each capture a transaction to the data table (e.g., 0.000000.json, 0.000001.json, 0.000002.json, etc.). A log file may include details of one or more transactions made to a respective set of data files of the data table. For example, the log may include the name of the data file, statistics of the data file including min-max ranges for a set of columns, size of the data file, type of transaction (e.g., write, add, update) committed, and the like. A transaction can be characterized as a series of actions made to the data files of the data table, for example, adding files, deleting files, etc.

In one embodiment, the metadata store 275 may also store one or more checkpoint files for the data table. Specifically, a set of checkpoint files describes the state of a data table at a given point in time by analyzing the transactions recorded in the log files until that time. Therefore, metadata for a data table may also be characterized by a set of checkpoint files (e.g., 0000010.checkpoint.parquet) and one or more log files (e.g., 0000011.json, 0000012.json, etc.) that describe transactions to the data table committed after the set of checkpoint files were created. In one implementation, the metadata in the transaction logs follow a Delta Transaction Protocol. A transaction layer configured to process data of a particular storage format writes the metadata files as transactions are committed by users on the data table and is also able to retrieve data relevant to a user query by reading the metadata files and identifying the relevant data files to read based on the metadata.

As described in further detail below, the metadata store 275 in one embodiment includes one or more metadata files in a second format (e.g., Apache Iceberg™) that is structured with different schema or protocols compared to the log files and checkpoint files in a first format described above. As further described below, the metadata files in the second format include information about transactions to the data table, but may be configured in a different markup language, schema, include additional information, and the like. As described in further detail below, in one embodiment, the metadata files of the second format are generated from the metadata files of a first format (e.g., the log files and checkpoint files) by a compute resource to capture commits to the data table over time. Therefore, a client equipped with a library for reading data of the second data format can serve a read operation (e.g., read columns/keys 1-10 having values above 20 for data table "employees") requested by a user if the converted metadata files of the second format correctly describe the current state of the table, without redundantly copying the data itself in the storage system.

This way, the universal write protocol configured by the data processing service 102 takes advantage of the fact that the data files for various data storage formats may comprise the same type of data files (e.g., parquet files) and an additional metadata layer describing the properties of the data. As described in further detail below in conjunction with FIG. 5, the data processing service 102 automatically generates metadata for a different data format without rewriting at least a portion of the data, such that clients supporting the different data format can read data tables as if they are tables stored in that format. Moreover, rather than having to separately copy the data into a particular data processing system or platform, a single copy of the data files can serve both formats in object storage.

Figure 3:
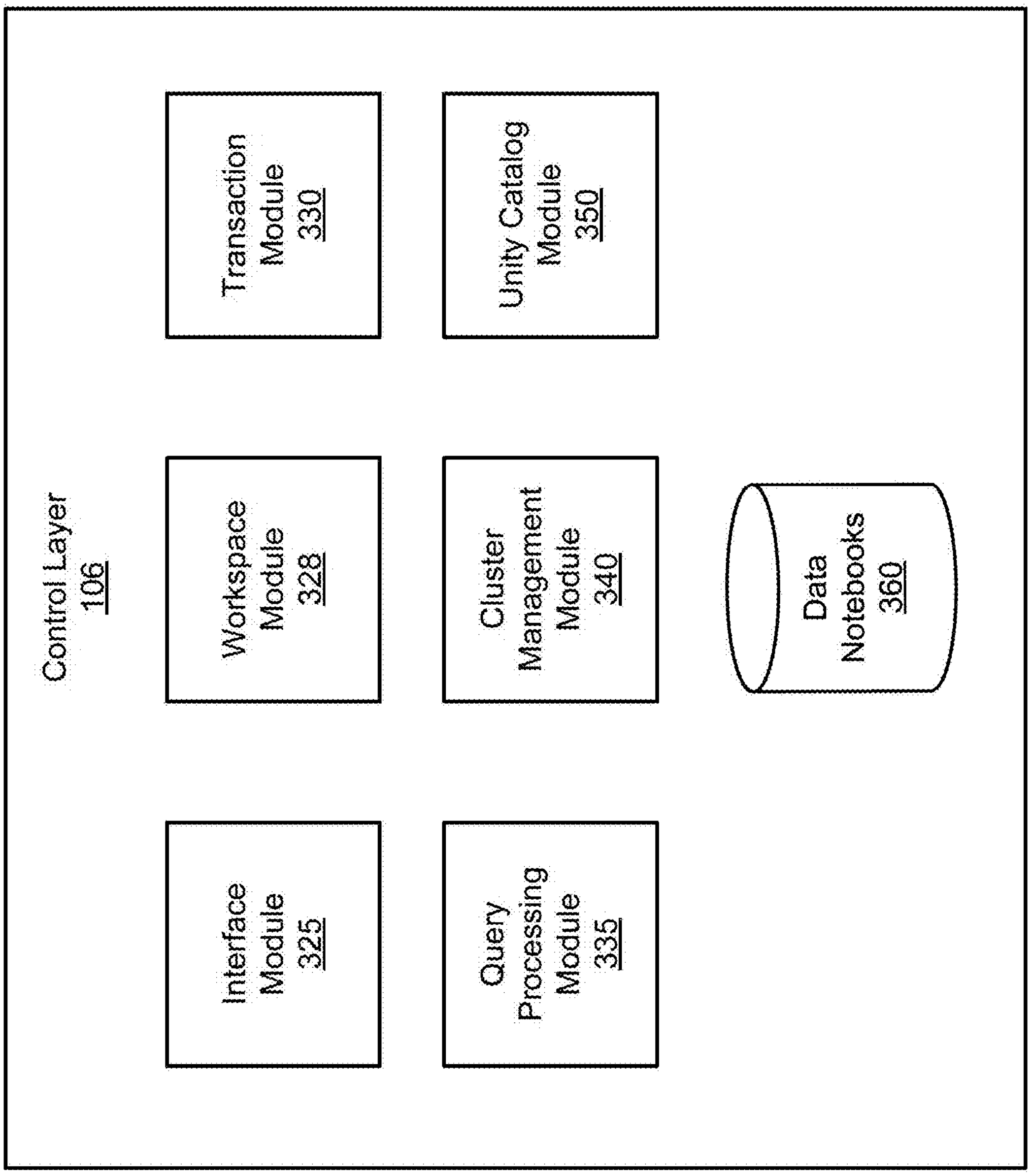
FIG. 3 illustrates a block diagram of an architecture of a control layer, in accordance with an embodiment.

FIG. 3 is a block diagram of an architecture of a control layer 106, in accordance with an embodiment. In one embodiment, the data processing system 106 includes an interface module 325, a workspace module 328, a transaction module 330, a query processing module 335, a cluster management module 340, and a unity catalog module 350. The control layer 106 also includes a data notebook store 360. The modules 325, 328, 330, 335, 340, and 350 may be structured for execution by a computer system, e.g., 700 having some or all of the components as described in FIG. 7, such that the computer system 700 operates in a specified manner as per the described functionality.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the workspace module 325.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The workspace module 328 deploys workspaces within the data processing service 102. A workspace as defined herein may refer to a deployment in the cloud that functions as an environment for users of the workspace to access assets. An account of the data processing service 102 represents a single entity that can include multiple workspaces. In one embodiment, an account associated with the data processing service 102 may be associated with one workspace. In another embodiment, an account may be associated with multiple workspaces. A workspace organizes objects, such as notebooks, libraries, dashboards, and experiments into folders. A workspace also provides users access to data objects, such as tables or views or functions, and computational resources such as cluster computing systems.

In one embodiment, a user or a group of users may be assigned to work in a workspace. The users assigned to a workspace may have varying degrees of access permissions to assets of the workspace. For example, an administrator of the data processing service 102 may configure access permissions such that users assigned to a respective workspace are able to access all of the assets of the workspace. As another example, users associated with different subgroups may have different levels of access, for example users associated with a first subgroup may be granted access to all data objects while users associated with a second subgroup are granted access to only a select subset of data objects.

The transaction module 330 receives requests to perform one or more transaction operations from users of client devices 116. As described in conjunction with FIG. 2, a request to perform a transaction operation may represent one or more requested changes to a data table. For example, the transaction may be to insert new records into an existing data table, replace existing records in the data table, and/or delete records in the data table. As another example, the transaction may be to rearrange or reorganize the records or the data files of a data table to, for example, improve the speed of operations, such as queries, on the data table. As an example, when a particular version of a data table has a significant number of data files composing the data table, some operations may be relatively inefficient.

In one embodiment, the transaction module 330 performs steps to provide universal write protocol for data tables, so that both clients supporting the particular data storage format used by the data processing service 102 as well as clients supporting other different data storage formats can read and retrieve the data in the data table. The transaction module 330 configures components and protocols in compute resources such that responsive to committing one or more changes to a data table stored in a first format (e.g., Delta Lake), a compute resource triggers generation of metadata capturing the change in a different second format (e.g., Apache Iceberg™) for the data table.

In this manner, a client (e.g., processing engine or tool equipped with libraries) supporting the second data storage format (e.g., Apache Iceberg™) can read the data in the data table, even though the client may not support reading the data in the first format (e.g., Delta Lake). The transaction module 330 may also receive indications from users of the data processing service 102 on which data tables should be configured with the universal format. The transaction module 330 updates properties of the data table in a catalog (e.g., the unity catalog module 350) to allow the universal format to be configured for the data table. In one embodiment, the conversion of the metadata is performed for only those tables that are specified in the catalog. A more detailed process of the metadata conversion is provided below in conjunction with FIG. 5.

The query processing module 335 processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. In some instances, the query processing module 335 may encounter runtime errors during execution of a database query and returns information describing the runtime error including an origin of the runtime error representing a position of the runtime error in the database query. In one embodiment, the query processing module 335 provides one or more queries to appropriate clusters of the data layer 108, and receives responses to the queries from clusters in which the queries are executed.

The unity catalog module 350 is a fine-grained data governance solution for managing assets within data processing service 102. Unity catalog module 350 may also be referred to as a data governance module. Unity catalog module 350 helps simplify security and governance by providing a central place to administer and audit data access. In one embodiment, unity catalog module 350 maintains one or more metastores for a respective account. A metastore is a top-level container of objects for the account. The metastore may store data objects and the permissions that govern access to the objects. A metastore for an account can be assigned to one or more workspaces associated with the account. In one embodiment, unity catalog module 350 organizes data as a three-level namespace, a catalogue is the first layer, a schema (also called a database) is the second layer, and tables and views are the third layer.

In one embodiment, the unity catalog module 350 enables read and write of data to data stored in cloud storage of the data storage system 110 on behalf of users associated with an account and/or workspace. In one instance, unity catalog module 350 manages storage credentials and external locations. A storage credential represents an authentication and authorization mechanism for accessing data stored on the data storage system 110. Each storage credential may be subject to access-control policies that control which users and groups can access the storage credential and in turn, data assets associated with the storage credential. An external location is an object that combines a cloud storage path (e.g., storage path in the data storage system 110) with a storage credential that authorizes access to the cloud storage path. Each storage location is subject to access-control policies that control which users and groups can access the storage credential. Thus, if a user does not have access to a storage credential in unity catalog module 350, unity catalog module 350 does not attempt to authenticate to the data storage system 110.

In one embodiment, unity catalog module 350 allows users to share assets of a workspace and/or account with users of other accounts and/or workspaces. For example, users of Company A can configure certain tables owned by Company A that are stored in the data storage system 110 to be shared with users of Company B. Each organization may be associated with separate accounts on the data processing service 102. Specifically, a provider entity can share access to one or more tables of the provider entity with one or more recipient entities.

Figure 4:
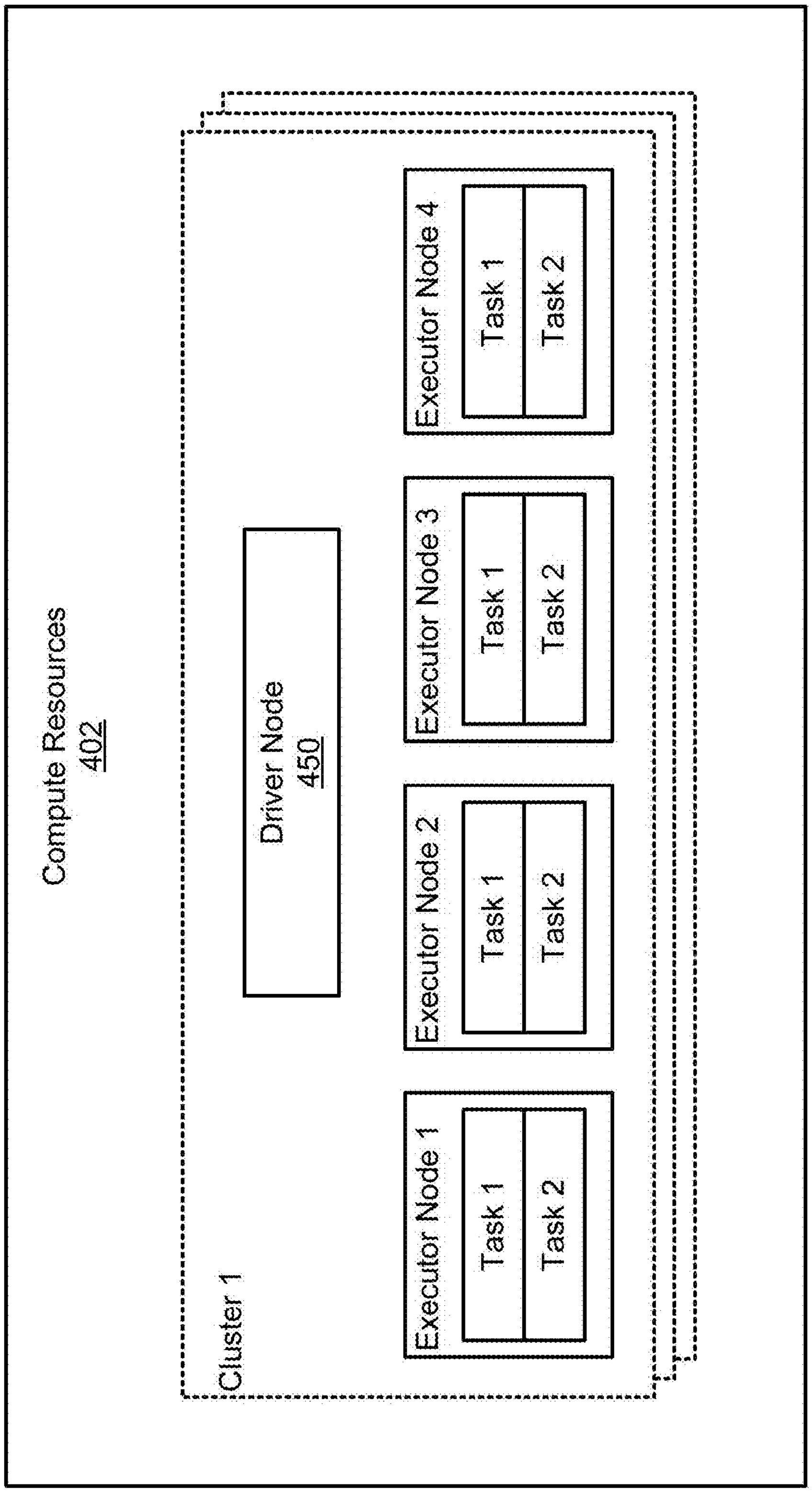
FIG. 4 illustrates a block diagram of an architecture of compute resources of the data layer and/or the control layer, in accordance with an embodiment.

FIG. 4 is a block diagram of an architecture of a cluster computing system 402 of the data layer 108, in accordance with an embodiment. In some embodiments, the cluster computing system 402 of the data layer 108 includes driver node 450 and worker pool including multiple executor nodes. The nodes may be structured for execution by a computer system, e.g., 700 having some or all of the components as described in FIG. 7, such that the computer system 700 operates in a specified manner as per the described functionality.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the query processing module 335. The driver node 450 may compile a database query and generate an execution plan. The driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing tasks of a job stage. In one embodiment, an execution engine performs single-threaded task execution in which a task is processed using a single thread of the CPU. The executor node distributes tasks for a job stage to the one or more execution engines and provides the results of the execution to the driver node 410. According to an embodiment, an executor node executes the generated code for the database query for a particular subset of data that is processed by the database query. The executor nodes execute the query based on the received information from the driver node 450.

Figure 5:
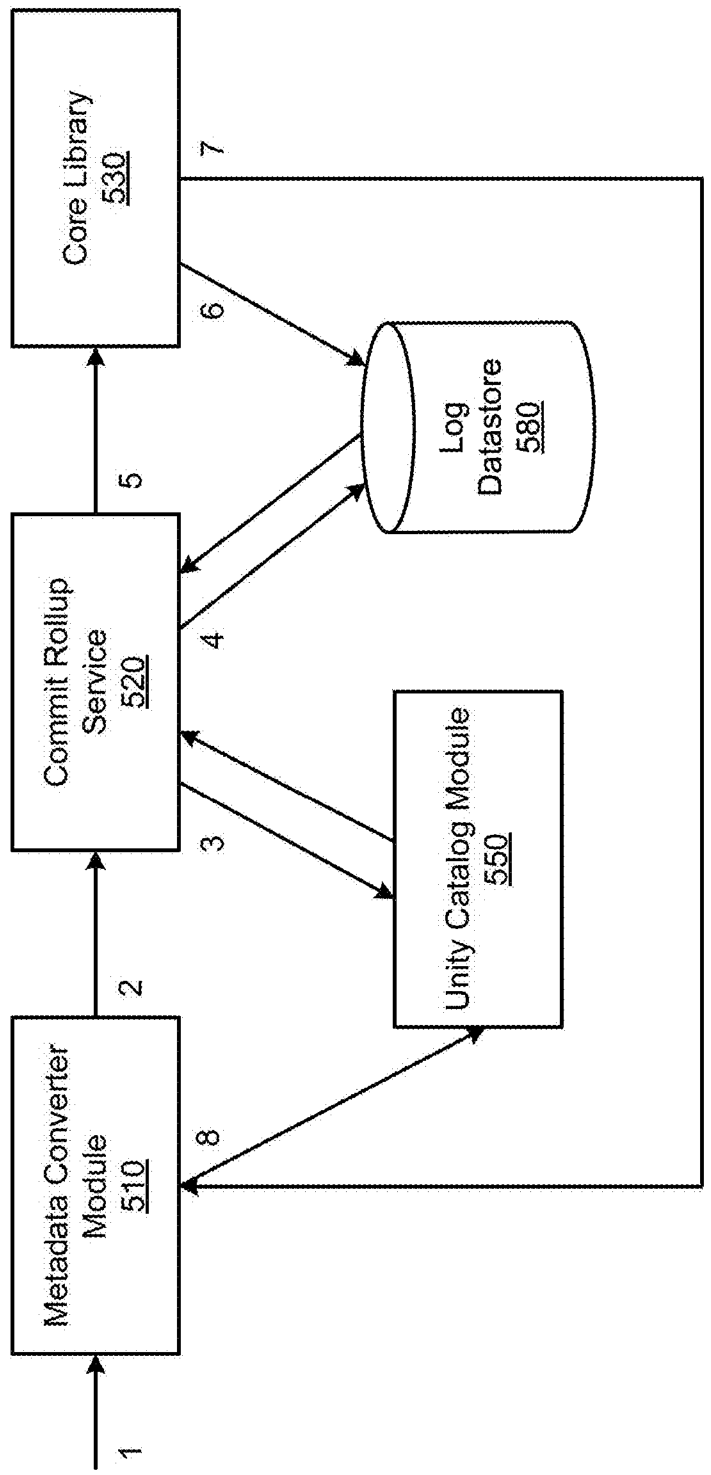
FIG. 5 illustrates an exemplary embodiment for writing to a data table and generating metadata for one or more data storage formats, in accordance with an embodiment.

FIG. 5 illustrates an embodiment for writing transactions to a data table and generating metadata for one or more data storage formats, in accordance with an embodiment. The process of FIG. 5 may be performed by, for example, a transaction layer configured on the compute resource 402 of FIG. 4. The transaction module 330 configures one or more components on the compute resource (e.g., cluster computing system 402 of FIG. 4) to convert metadata files generated in a first format to metadata files in a second format.

In the example shown in FIG. 5, a data table stored in a storage system for a user of the data processing service 102 and given an n-th version or snapshot of the data table, an (n+i)-th transaction has been committed that adds, modifies, or deletes records or files from the data table, where i can be 1, 2, and so on. The details of the (n+i)-th transaction commit are written to metadata (e.g., in the metadata store 275) as one or more JSON files or checkpoint files according to a first data storage format (e.g., Delta Lake). The process of FIG. 5 may be triggered after the commit has been completed, so that clients equipped with libraries of the second data storage format can retrieve and process data from the data table.

Specifically, the metadata converter module 510 runs one or more jobs after a commit has been completed for a data table in the first data storage format (indicated by step "1" in FIG. 5). In one embodiment, the metadata converter module 510 receives a snapshot capturing a state of the data table after the commit (indicated by step "2" in FIG. 5). The metadata converter module 510 then calls a commit rollup service 520 to generate metadata files in a second data storage format.

The commit rollup service 520 generates performs a set of actions to generate a new commit metadata files in the second data storage format. Specifically, the commit rollup service 520 retrieves table metadata (indicated by step "3" in FIG. 5) from the unity catalog module 550 that may have identical or substantially similar functionalities as the unity catalog module 350. The commit rollup service 520 queries a dedicated directory for storing the metadata files for the second data storage format, and attempts to retrieve the recently written metadata file in the second format from the directory (indicated by step "4" in FIG. 5).

In one embodiment, if no metadata files are found, this implies that the current trigger is the first convert to the metadata in the second format that has been performed on the data table. Thus, the commit rollup service 520 obtains the list of all actions on the data table so far that were committed in the first data storage format. For example, the list may include actions from version 0 to version (n+i) of the data table. For each action, such as addfile, removefile, metadata, etc. in the data table, the commit rollup service 520 converts to the equivalent metadata in the second format, and writes out the necessary files using a library to, for example, "vi.metadata.json."

If a recent metadata file is found, the full contents of the recent written metadata file in the second format is retrieved. The commit rollup service 520 uses the properties of the retrieved metadata file to identify the last commit in the first data storage format that had been converted to the second data storage format. For example, the existing version of the metadata files in the second format may include a snapshot metadata file "v(m).metadata.json," in which the m-th snapshot corresponds to the n-th version of the data table in the first format. The commit rollup service 520 obtains a subset of transactions since the last identified commit (one or multiple commits). The commit rollup service 520 converts the subset of transactions to the second data storage format, and then writes out the snapshot metadata file to "(m+1).metadata.json." Here, the (m+1)-th snapshot may incorporate the i number of transactions that were performed to the data table in the first data storage format.

In one embodiment, the conversion process is triggered each time a transaction is committed to the data table. In another embodiment, when multiple transactions have been committed to the data table (i.e., i>1) and the number is significantly large, the commit rollup service 520 consolidates the i number of transactions to a reduced set of transactions that delete redundant transactions. In one instance, the consolidation is performed by a log compaction module that consolidates the actions from snapshot version (n+1) through (n+i) in the first format. The reduced set of transactions are then converted to the metadata files of the second data storage format.

If a recent metadata file is found, but the last version of the data table converted has been cleaned up or deleted from the metadata files of the first data storage format, this implies that the user may have been triggering manual conversions or the auto-synchronizing feature for converting has been turned on and off. In this instance, the commit rollup service 520 rewrites actions in the data table, similar to when no recent metadata file has been found. The conversion may be performed by extracting information from the metadata files of the first data storage format through parsing (e.g., parsing column value ranges), and creating the metadata files of the second data storage format to incorporate the extracted information according to the schema of the second data storage format. The conversion may also be performed by using a library provided by an entity managing the code of the second format to write the transaction into the metadata files of the second format.

In one embodiment, the metadata files of the second data storage format follow a different specification or schema from the metadata files of the first data storage format, but include same or substantially similar information, such as the name of the parquet data files, the partition ranges for the data files, the memory size for storing the data files, and the like. For example, the metadata files of the second format may include a metadata file storing the schema, partition information, and snapshots of the data table. The metadata files may also include a manifest list including a list of manifest files that make up the snapshot, as well as information about the location and corresponding partitions of the data files. The metadata files may also include manifest files to track the data files and additional information about them, like file format, scan planning, partitioning, pruning, and column/key level statistics such as mix and max values.

In one embodiment, for a given transaction, the commit rollup service 520 obtains a sequence of actions that were performed to complete the subset of transactions, and converts the actions to equivalent actions in the second data storage format. The metadata files in the second data storage format are written using the library 530. Specifically, the metadata files for the transaction in the first data storage format may have a set of fields that describe various properties of the transaction. The commit rollup service 520 parses and extracts values for one or more fields from the metadata files. For a given field from the first data storage format, the commit rollup service 520 may identify a corresponding field for the second data storage format that matches the field, and provides the values for the field to the library 530. Based on the identified fields and values for the actions that make up the transaction, the library 530 writes the necessary metadata files according to the protocol of the second data storage format.

In one example, an action is an "add" action to add a data file to the data table. An example for the first data storage format as Delta Lake is shown below:

```
"add": {
    "path": "part-00000-4e0eecf . . . c00.parquet",
    "partitionValues": { },
    "size": 928
    "modificationTime": 1679759648749,
    "dateChange": true,
    "stats": "{\"numRecords\":1,\minValues\":
{\"id\":1,\"name\":\"John\",\"birthdate\":\"1980-01-
01\",\maxValues\":{\"id\":,\"name\":\"John\",\
"birthdate\":\"1980-01-01\"}",
    "tags": { }
).
```

The commit rollup service 520 identifies and extracts the values for one or more fields in the metadata file of the first data storage format and provides the values to the library 530. The extracted values are written as the values for one or more matching fields in the metadata file of the second data storage format. An example for the second format as Iceberg is shown below:

```
"status": 1,
"snapshot_id: 742664780093288484,
"sequence_number": null,
"file_sequence_number": null,
"data_file": {
    "content": 0,
    "file_path": "part-00000-4e0eecf . . . c00.parquet",
    "file_format": "PARQUET",
    "partition": { },
    "record_count": 1,
    "file_size_in_bytes": 164,
    . . .
    "lower_bounds": {
```

-continued

```
"array": [{"key":1,"value":1},
{"key":2,"value":"John"}, {"key":3,"value":
"1980-01-01"}]
},
"upper_bounds":
"array": [{"key":1,"value":1},
{"key":2,"value":"John"}, {"key":3,"value":
"1980-01-01"}]
},
"key_metadata": null,
"split_offsets": { },
).
```

In another example, an action is a "remove" action to remove a data file to the data table. An example for the first data storage format as Delta Lake is shown below:

```
"remove": {
    "path": "part-00000-fb2fa16c-f20c . . . c00.parquet",
    "deletionTimestamp": 16816849305,
    "dateChange": true,
    "extendedFileMetadata": true,
    "partitionValues": { },
    "size": 956,
    "tags": { }
).
```

An example for the second data storage format as Iceberg is shown below:

```
"status": 2,
"snapshot_id: 78293948589493,
"sequence_number": 1,
"file_sequence_number": 1,
"data_file": {
    "content": 0,
    "file_path": "part-00000-fb2fa16c-f20c . . . c00.parquet",
    "file_format": "PARQUET",
    "partition": { },
    "record_count": 3,
    . . .
}.
```

Therefore, the commit rollup service 520 identifies a first snapshot (e.g., (n+i)-th snapshot) of the data table that is associated with one or more transactions written to one or more metadata files according to the first data storage format. The commit rollup service 520 identifies a subset of transactions that need to be converted to the second data storage format, and obtains a sequence of actions corresponding to the transactions. The commit rollup service 520 converts the sequence of actions to a set of equivalent actions in the second data storage format. The set of equivalent actions are written to one or more metadata files of a second snapshot (e.g., (m+1)-th) of the data table in the second data storage format.

Specifically, for a given transaction in a metadata file of the first data storage format, the conversion may cause an update to the snapshot metadata file to incorporate the current snapshot of the data table, the creation of a new manifest list file, and the creation of one or more new manifest files that the manifest list file points to in addition to existing manifest files that were previously present. For example, a transaction that adds a Data File E to the data table may cause the conversion process to generate a new manifest file describing Data File E. As another example, a transaction that updates a row in Data File F may cause the conversion process to generate two new manifest files, one file that records the deletion of Data File F and another file that records the addition of Data File G that incorporates the update to the row.

The commit rollup service 520 provides the created metadata files in the second format to an imported library 530 (e.g., Iceberg library) (indicated by step "5" in FIG. 5). The imported library 530 commits the created metadata files into the directory to store the metadata files (indicated by step "6" in FIG. 5). Once the new metadata files of the second format have been written to the underlying log data store (e.g., a directory within the metadata store 275), the metadata file path is provided to the metadata converter module 510 (indicated by step "7" in FIG. 5). The metadata converter module 510 requests an update to the unity catalog module 550, such that a pointer to the metadata files can be updated (indicated by step "8" in FIG. 5).

In this manner, a client configured with a client library for reading data in the second data storage format can also read data from the data table, even though the data is also stored according to the first data storage format. In one embodiment, some clients require users to provide a path to the versioned metadata files in the second format to register external data tables. A user can retrieve the path of the metadata files and use the path to configure the client to read the data table. In the example below, the path to the metadata files created for the second format is given by "s3://tmp/v10.metadata.json."

```
CREATE EXTERNAL TABLE externalIcebergTbl
WITH CONNECTION `abc-us-east-1.connection`
OPTIONS(
    format = 'ICEBERG',
    uris = ["s3://tmp/v10.metadata.json"]
);
```

In another embodiment, the unity catalog module 350 is further configured with a REST catalog API allowing a user to request a read operation on the data table with a client device supporting the second data storage format. Therefore, the unity catalog module 350 can act as a catalog for the second data storage format. The client can point to the unity catalog module 350 as the catalog and query the data table in the second data storage format, as well as make commits to the data table via API calls.

In one embodiment, the conversion process is triggered automatically when a commit is made to the data table in the first data storage format. In another embodiment, the conversion process is triggered manually by a user of the data processing service 102 via, for example, a manual SQL command "CONVERT TO <DATA FORMAT 2> <table name>." The number and size of metadata files can become significantly large as each file may have a reference to a snapshot of the data table. Thus, each metadata file could become on the order of MB, regardless of how much data was added in the commit. Thus, manually triggering the conversion process when a user requests the conversion prevents this problem by reducing the size of each metadata file as a result of fewer snapshots being referenced, in addition to the number of files being reduced. In one embodiment, the user can submit a database query such as: ALTER TABLE T SET TBLPROPERTIES('<data format 1>.universalFormat.enabledFormats={'<data format 2>'}) to enable triggering metadata conversions.

In one embodiment, the user can submit a commit request that covers one or more changes (e.g., additional rows, deletion of rows, change in values of columns and rows) to a data table via the unity catalog module 350. The data processing service 102 can perform the commit request based on the metadata files of the first data storage format to write changes to the data files or can perform the commit request based on the metadata files of the second data storage format to write changes to the data files of the data table. As an example, responsive to a user submitting a write request, the transaction layer may read the current state of the data table in the metadata files of the first data storage format and make one or more changes to the relevant data files of the data table based on the request. The transaction layer may create a new metadata file (e.g., JSON file) capturing that transaction. The transaction layer is also able to perform similar steps when a user requests a commit request using the second data storage format.

Method of Writing Metadata for a Second Data Storage Format

Figure 6:
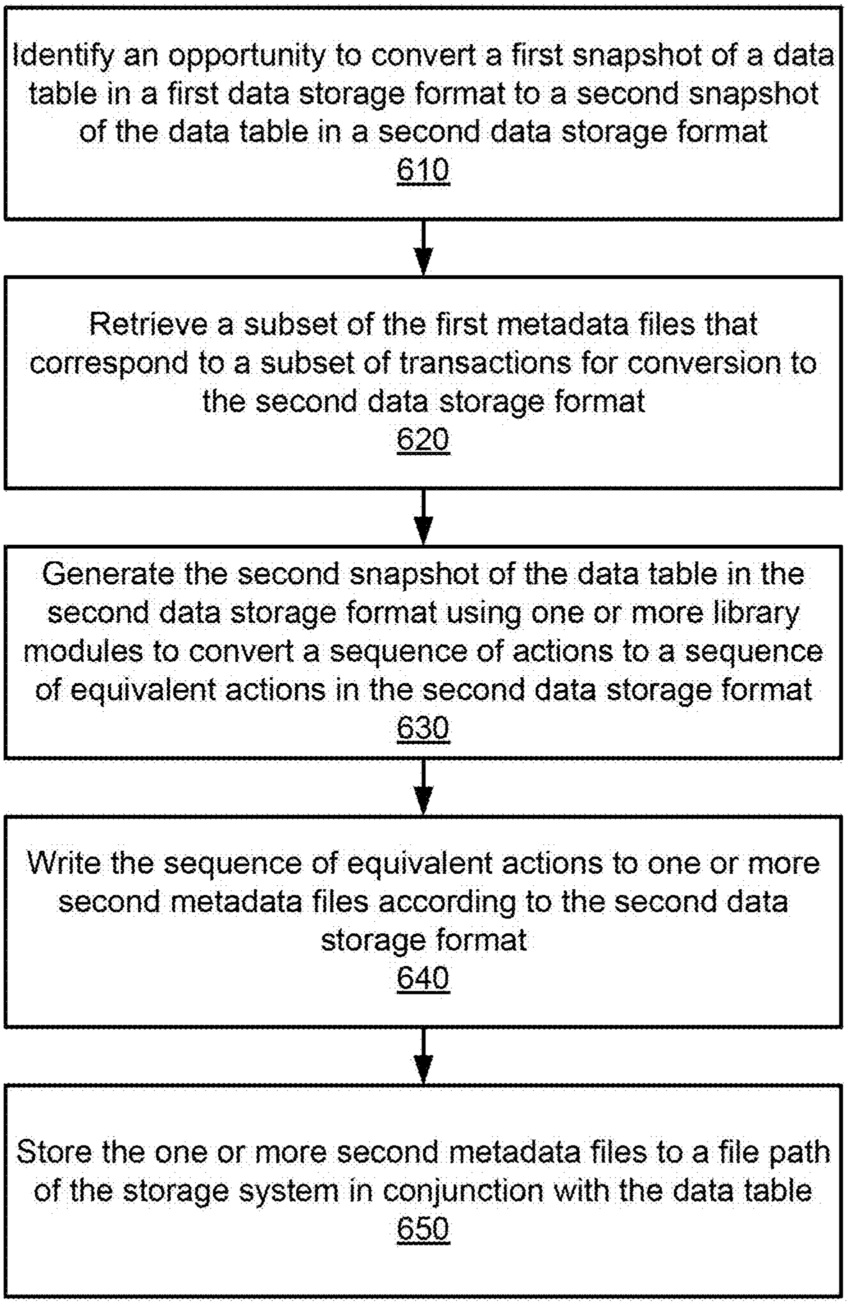
FIG. 6 a flowchart illustrating a method of writing metadata for a second data storage format from metadata for a first data storage format, in accordance with an embodiment.

FIG. 6 a flowchart illustrating a method of writing metadata for a second data storage format from metadata for a first data storage format, in accordance with an embodiment. The process shown in FIG. 6 may be performed by one or more components (e.g., the control layer 106 or data layer 108) of a data processing system/service (e.g., the data processing service 102). Other entities may perform some or all of the steps in FIG. 6.

The data processing service 102 identifies 610 an opportunity to convert a first snapshot of a data table in a first data storage format to a second snapshot of the data table in a second data storage format. In one embodiment, the first snapshot of the data table is represented by a set of data files and is associated with one or more transactions written to one or more first metadata files. The data processing service 102 retrieves 620, from a storage system, a subset of the first metadata files that correspond to a subset of transactions for conversion to the second data storage format. The data processing service generates 630 the second snapshot of the data table in the second data storage format. In one embodiment, the data processing service 102 uses one or more library modules associated with the second data storage format to convert a sequence of actions representing the subset of transactions in the first data storage format to a sequence of equivalent actions in the second data storage format. The data processing service 102 writes 640 the sequence of equivalent actions to one or more second metadata files according to the second data storage format. The data processing service 102 stores 650 the one or more second metadata files to a file path of the storage system in conjunction with the data table.

Example Machine to Read and Execute Instructions

Figure 7:
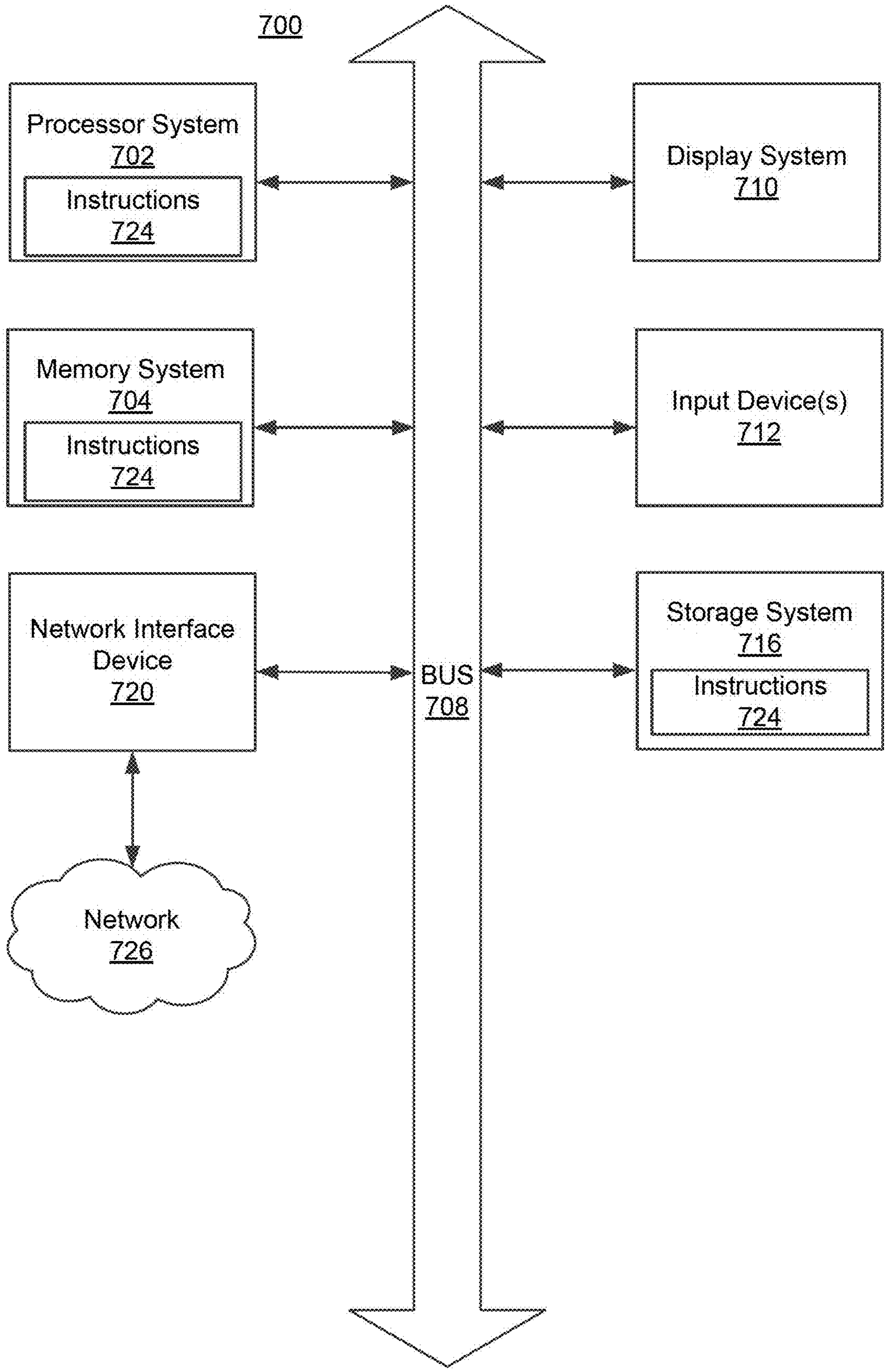
FIG. 7 is a block diagram illustrating an example machine to read and execute computer readable instructions, in accordance with an embodiment.

Turning now to FIG. 7, illustrated is an example machine to read and execute computer readable instructions, in accordance with an embodiment. Specifically, FIG. 7 shows a diagrammatic representation of the data processing service 102 (and/or data processing system) in the example form of a computer system 700. The computer system 700 is structured and configured to operate through one or more other systems (or subsystems) as described herein. The computer system 700 can be used to execute instructions 724 (e.g., program code or software) for causing the machine (or some or all of the components thereof) to perform any one or more of the methodologies (or processes) described herein. In executing the instructions, the computer system 700 operates in a specific manner as per the functionality described. The computer system 700 may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The computer system 700 may be a server computer, a client computer, a personal computer (PC), a tablet PC, a smartphone, an internet of things (IoT) appliance, a network router, switch or bridge, or other machine capable of executing instructions 724 (sequential or otherwise) that enable actions as set forth by the instructions 724. Further, while only a single machine is illustrated, the term "machine" shall also be taken to include any collection of machines that individually or jointly execute instructions 724 to perform any one or more of the methodologies discussed herein.

The example computer system 700 includes a processing system 702. The processor system 702 includes one or more processors. The processor system 702 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor system 702 executes an operating system for the computing system 700. The computer system 700 also includes a memory system 704. The memory system 704 may include or more memories (e.g., dynamic random access memory (RAM), static RAM, cache memory). The computer system 700 may include a storage system 716 that includes one or more machine readable storage devices (e.g., magnetic disk drive, optical disk drive, solid state memory disk drive).

The storage unit 716 stores instructions 724 (e.g., software) embodying any one or more of the methodologies or functions described herein. For example, the instructions 724 may include instructions for implementing the functionalities of the transaction module 330 or the cluster computing system 402. The instructions 724 may also reside, completely or at least partially, within the memory system 704 or within the processing system 702 (e.g., within a processor cache memory) during execution thereof by the computer system 700, the main memory 704 and the processor system 702 also constituting machine-readable media. The instructions 724 may be transmitted or received over a network 726, such as the network 726, via the network interface device 720.

The storage system 716 should be taken to include a single medium or multiple media (e.g., a centralized or distributed database, or associated caches and servers communicatively coupled through the network interface device 720) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

In addition, the computer system 700 can include a display system 710. The display system 710 may driver firmware (or code) to enable rendering on one or more visual devices, e.g., drive a plasma display panel (PDP), a liquid crystal display (LCD), or a projector. The computer system 700 also may include one or more input/output systems 712. The input/output (IO) systems 712 may include input devices (e.g., a keyboard, mouse (or trackpad), a pen (or stylus), microphone) or output devices (e.g., a speaker). The computer system 700 also may include a network interface device 720. The network interface device 720 may include one or more network devices that are configured to communicate with an external network 726. The external network 726 may be a wired (e.g., ethernet) or wireless (e.g., WiFi, BLUETOOTH, near field communication (NFC).

The processor system 702, the memory system 704, the storage system 716, the display system 710, the IO systems 712, and the network interface device 720 are communicatively coupled via a computing bus 708.

ADDITIONAL CONSIDERATIONS

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A computer-implemented method, comprising:
- identifying an opportunity to convert a first snapshot of a data table in a first data storage format to a second snapshot of the data table in a second data storage format, wherein the first snapshot of the data table is represented by a set of data files and is associated with one or more transactions written to one or more first metadata files;
- identifying a previous snapshot of the data table in the first data storage format that was converted to a respective snapshot in the second data storage format;
- retrieving, from a storage system, a subset of the one or more first metadata files that correspond to a subset of transactions for conversion to the second data storage format, wherein the subset of transactions includes transactions occurring from the previous snapshot of the data table to the first snapshot of the data table;
- generating the second snapshot of the data table in the second data storage format, comprising:
  - using one or more library modules associated with the second data storage format to convert a sequence of actions representing the subset of transactions in the first data storage format to a sequence of equivalent actions in the second data storage format, and
  - writing the sequence of equivalent actions to one or more second metadata files according to the second data storage format; and
- storing the one or more second metadata files to a file path of the storage system in conjunction with the data table.

2. The computer-implemented method of claim 1, wherein the sequence of actions include one or more actions to add new data files to the data table, and wherein the one or more second metadata files include one or more manifest files indicating that the new data files were added to the data table and describing properties of the new data files.

3. The computer-implemented method of claim 1, wherein the sequence of actions include one or more actions to remove data files from the data table, and wherein the one or more second metadata files include one or more manifest files indicating that the data files were removed from the data table.

4. The computer-implemented method of claim 1, further comprising:
- receiving, from a client, a request to perform a read operation on the data table based on the second data storage format;
- reading the one or more second metadata files to identify at least a subset of data files to read to satisfy the request from a second client device; and
- returning results of the read operation as a response to the request.

5. The computer-implemented method of claim 4, further comprising:

configuring a catalogue interface and linking, in a database, the data table and the file path to the one or more second metadata files; and responsive to receiving the request for the data table, accessing the file path to read the one or more second metadata files.

6. The computer-implemented method of claim 1, wherein the one or more first metadata files include one or more checkpoint parquet files.

7. A non-transitory computer readable storage medium comprising stored program code, the stored program code comprising instructions, the instructions when executed cause a processor system to:

identify an opportunity to convert a first snapshot of a data table in a first data storage format to a second snapshot of the data table in a second data storage format, wherein the first snapshot of the data table is represented by a set of data files and is associated with one or more transactions written to one or more first metadata files;

identify a previous snapshot of the data table in the first data storage format that was converted to a respective snapshot in the second data storage format;

retrieve, from a storage system, a subset of the one or more first metadata files that correspond to a subset of transactions for conversion to the second data storage format, wherein the subset of transactions includes transactions occurring from the previous snapshot of the data table to the first snapshot of the data table;

generate the second snapshot of the data table in the second data storage format, the instructions further causing the processor system to:

use one or more library modules associated with the second data storage format to convert a sequence of actions representing the subset of transactions in the first data storage format to a sequence of equivalent actions in the second data storage format, and write the sequence of equivalent actions to one or more second metadata files according to the second data storage format; and store the one or more second metadata files to a file path of the storage system in conjunction with the data table.

8. The non-transitory computer readable storage medium of claim 7, wherein the sequence of actions include one or more actions to add new data files to the data table, and wherein the one or more second metadata files include one or more manifest files indicating that the new data files were added to the data table and describing properties of the new data files.

9. The non-transitory computer readable storage medium of claim 7, wherein the sequence of actions include one or more actions to remove data files from the data table, and wherein the one or more second metadata files include one or more manifest files indicating that the data files were removed from the data table.

10. The non-transitory computer readable storage medium of claim 7, the instructions further causing the processor system to:

receive, from a client, a request to perform a read operation on the data table based on the second data storage format;

read the one or more second metadata files to identify at least a subset of data files to read to satisfy the request from a second client device; and return results of the read operation as a response to the request.

11. The non-transitory computer readable storage medium of claim 10, the instructions further causing the processor system to:

configure a catalogue interface and linking, in a database, the data table and the file path to the one or more second metadata files; and responsive to receiving the request for the data table, access the file path to read the one or more second metadata files.

12. The non-transitory computer readable storage medium of claim 7, wherein the one or more first metadata files include one or more checkpoint parquet files or one or e SON files.

13. A computer system comprising:

a processor system; and non-transitory computer readable storage medium comprising stored program code, the stored program code comprising instructions, the instructions when executed cause a processor system to:

identify an opportunity to convert a first snapshot of a data table in a first data storage format to a second snapshot of the data table in a second data storage format, wherein the first snapshot of the data table is represented by a set of data files and is associated with one or more transactions written to one or more first metadata files;

identify a previous snapshot of the data table in the first data storage format that was converted to a respective snapshot in the second data storage format;

retrieve, from a storage system, a subset of the one or more first metadata files that correspond to a subset of transactions for conversion to the second data storage format, wherein the subset of transactions includes transactions occurring from the previous snapshot of the data table to the first snapshot of the data table;

generate the second snapshot of the data table in the second data storage format, the instructions further causing the processor system to:

use one or more library modules associated with the second data storage format to convert a sequence of actions representing the subset of transactions in the first data storage format to a sequence of equivalent actions in the second data storage format, and write the sequence of equivalent actions to one or more second metadata files according to the second data storage format; and store the one or more second metadata files to a file path of the storage system in conjunction with the data table.

14. The computer system of claim 13, wherein the sequence of actions include one or more actions to add new data files to the data table, and wherein the one or more second metadata files include one or more manifest files indicating that the new data files were added to the data table and describing properties of the new data files.

15. The computer system of claim 13, wherein the sequence of actions include one or more actions to remove data files from the data table, and wherein the one or more second metadata files include one or more manifest files indicating that the data files were removed from the data table.

16. The computer system of claim 13, the instructions further causing the processor system to:

receive, from a client, a request to perform a read operation on the data table based on the second data storage format;

read the one or more second metadata files to identify at least a subset of data files to read to satisfy the request from a second client device; and return results of the read operation as a response to the request.

17. The computer system of claim 16, the instructions further causing the processor system to:

configure a catalogue interface and linking, in a database, the data table and the file path to the one or more second metadata files; and responsive to receiving the request for the data table, access the file path to read the one or more second metadata files.

18. The computer system of claim 13, wherein the one or more first metadata files include one or more checkpoint parquet files.

* * * * *